(12) United States Patent
Kanzaka et al.

(10) Patent No.: US 10,100,792 B2
(45) Date of Patent: Oct. 16, 2018

(54) FLUID MACHINE AND FLUID MACHINE SYSTEM EQUIPPED WITH THE SAME

(71) Applicant: MITSUBISHI HEAVY INDUSTRIES, LTD., Tokyo (JP)

(72) Inventors: Tadashi Kanzaka, Tokyo (JP); Isao Tomita, Tokyo (JP); Makoto Ozaki, Tokyo (JP); Koji Wakashima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 518 days.

(21) Appl. No.: 14/761,547

(22) PCT Filed: Feb. 21, 2013

(86) PCT No.: PCT/JP2013/054406
§ 371 (c)(1),
(2) Date: Jul. 16, 2015

(87) PCT Pub. No.: WO2014/128896
PCT Pub. Date: Aug. 28, 2014

(65) Prior Publication Data
US 2015/0337780 A1    Nov. 26, 2015

(51) Int. Cl.
*F02M 35/10* (2006.01)
*F02B 37/00* (2006.01)
(Continued)

(52) U.S. Cl.
CPC ....... *F02M 35/10131* (2013.01); *F02B 37/00* (2013.01); *F04D 25/04* (2013.01);
(Continued)

(58) Field of Classification Search
CPC ............. F02M 35/10; F02M 35/10091; F02M 35/1011; F02M 35/10131; F04D 29/4206;
(Continued)

(56) References Cited

U.S. PATENT DOCUMENTS 6,021,764 A    2/2000   Koyama
2003/0150408 A1    8/2003   Roithinger
(Continued)

FOREIGN PATENT DOCUMENTS

CN    102269088 A    12/2011
EP    2163746 A2    3/2010
(Continued)

OTHER PUBLICATIONS

Machine Translation JP 2007-327440A, dated Dec. 20, 2007.*
(Continued)

*Primary Examiner* — Mark Laurenzi
*Assistant Examiner* — Mickey France
(74) *Attorney, Agent, or Firm* — Birch, Stewart, Kolasch & Birch, LLP (57) ABSTRACT

An object is to provide a fluid machine whereby it is possible to improve performance, for example, expand a flow-rate operation rage with a simplified shape of an intake pipe. A fluid machine includes an impeller mounted to a rotation shaft, a housing which houses the impeller rotatably, and an intake pipe for supplying a fluid to the housing. The intake pipe includes at least a first bend portion disposed on a first plane, and a second bend portion disposed at a downstream side of the first bend portion and on a second plane which is different from the first plane. The second bend portion includes an upstream section having a center axis oriented along a center axis of a downstream section of the first bend portion and a downstream section having a center axis oriented along an axial direction of the impeller at a front of the impeller. The intake pipe has a constant cross-sectional shape from an upstream end of the first bend portion to a downstream end of the second bend portion.

12 Claims, 8 Drawing Sheets

(51) Int. Cl.
*F04D 29/42* (2006.01)
*F04D 29/44* (2006.01)
*F04D 25/04* (2006.01)

(52) U.S. Cl.
CPC ..... *F04D 29/4206* (2013.01); *F04D 29/4213* (2013.01); *F04D 29/441* (2013.01); *F05D 2250/51* (2013.01); *Y02T 10/144* (2013.01); *Y02T 10/146* (2013.01)

(58) Field of Classification Search
CPC .... F04D 29/4213; F04D 29/441; F04D 25/04; F02B 37/00; F02B 33/00; F02B 37/007; F05D 2250/51; Y02T 10/146; Y02T 10/144
USPC ........................................ 415/203, 204, 206
See application file for complete search history.

(56) References Cited

U.S. PATENT DOCUMENTS

| | | |
|---|---|---|
| 2007/0036662 A1 | 2/2007 | Pesola et al. |
| 2010/0061843 A1 | 3/2010 | Anderson et al. |
| 2011/0299981 A1 | 12/2011 | Li |
| 2013/0112298 A1 | 5/2013 | Nakae et al. |

FOREIGN PATENT DOCUMENTS

| | | |
|---|---|---|
| JP | 59-139599 U | 9/1984 |
| JP | 60-131630 U | 9/1985 |
| JP | 3-68528 U | 7/1991 |
| JP | 8-121399 A | 5/1996 |
| JP | 2007-46610 A | 2/2007 |
| JP | 2007-327440 A | 12/2007 |
| JP | 4464661 B2 | 2/2010 |
| JP | 2010-65681 A | 3/2010 |
| JP | 2010-209688 A | 9/2010 |
| JP | 2011-256831 A | 12/2011 |
| JP | 60-190942 U | 7/2012 |
| JP | 2012-140819 A | 7/2012 |
| JP | 2012-154182 A | 8/2012 |
| JP | 2013-181414 A | 9/2013 |

OTHER PUBLICATIONS

Decision to Grant a Patent received on Dec. 16, 2016 issued to the corresponding JP Application No. 2015-501167 with an English Translation.
Chinese Office Action and Search Report, dated Jul. 5, 2016, for corresponding Chinese Application No. 201380069282.4, with an English translation.
Extended European Search Report for European Application No. 13876013.7, dated May 31, 2016.
International Preliminary Report on Patentability and Written Opinion of the International Searching Authority (Forms PCT/IB/338, PCT/IB/373, PCT/ISA/237 and PCT/IB/326), dated Sep. 3, 2015, for International Application No. PCT/JP2013/054406, together with an English translation thereof.
International Search Report and Written Opinion of the International Searching Authority (Forms PCT/ISA/210, PCT/ISA/220 and PCT/ISA/237), dated May 21, 2013, for International Application No. PCT/JP2013/054406.
Japanese Office Action for Japanese Application No. 2015-501167, dated Jun. 3, 2016, with an English translation.

* cited by examiner

RELATED ART

FIG.4B

RELATED ART

FIG.5A

RELATED ART

FIG.5B

RELATED ART

FLUID MACHINE AND FLUID MACHINE SYSTEM EQUIPPED WITH THE SAME

TECHNICAL FIELD

The present disclosure relates to a compressor such as a centrifugal compressor and a mixed-flow compressor, as well as a blower such as a centrifugal blower and a mixed-flow blower (hereinafter, collectively referred to as a fluid machine). The present disclosure especially relates to an intake-pipe configuration for supplying a fluid to a fluid machine.

BACKGROUND

In a turbocharger mounted to a vehicle, a ship, and an industrial engine, used is a compressor which includes an impeller that rotates at a high speed and increases a pressure of a fluid taking advantageous of a centrifugal force. For such a compressor of a turbocharger, it is desirable to achieve a wide flow-rate operation range in terms of the performance of an engine, for example, to improve the engine torque performance or to increase the engine output.

As a measure to expand the flow-rate operation range of such a compressor, there is a pre-swirl generation device in which a variable mechanism such as guide vanes is disposed at the upstream side of the compressor, and the variable mechanism is controlled to generate a swirl flow in the fluid, so as to expand the flow-rate operation range (Patent Document 1).

Further, an application previously filed by the present applicant and not published yet (Patent Document 2) discloses a technique to expand the flow-rate operation range by modifying the shape of an intake pipe at the upstream side of a compressor and generating a swirl flow in a fluid flowing through the intake pipe.

CITATION LIST

Patent Literature

Patent Document 1: JP4464661B
Patent Document 2: JP2012-044103A

SUMMARY

Problems to be Solved

However, the pre-swirl generation device of Patent Document 1 is to operate a variable mechanism with a mechanical unit such as an actuator, and thus there are several problems, such as the increased size of the device, the complicated structure, and the increased cost. Especially in a turbocharger for an automobile, there is a strong need for reduction of the device size, a simplified structure, and cost cut. Thus, it is difficult to adopt the above mechanical unit in a turbocharger for an automobile.

In this regard, the above technique of Patent Document 2 is advantageous in that the flow-rate operation range can be widened without using a mechanical unit. However, the intake pipe has a complicated three-dimensional shape. Thus, if it possible to generate a swirl flow in a fluid with an intake pipe having a more simplified shape, an increase in versatility upon mounting of an engine or the like can be expected.

At least one embodiment of the present invention was made in view of the above technical background. An object is to provide a fluid machine whereby it is possible to enhance the performance, for example, to expand the flow-rate operation range, with a simplified shape of an intake pipe.

Solution to the Problems

A fluid machine according to at least one embodiment of the present invention includes: an impeller mounted to a rotation shaft; a housing which houses the impeller rotatably; and an intake pipe for supplying a fluid to the housing. The intake pipe includes at least: a first bend portion disposed on a first plane; and a second bend portion disposed at a downstream side of the first bend portion and on a second plane which is different from the first plane, the second bend portion including an upstream section having a center axis oriented along a center axis of a downstream section of the first bend portion and a downstream section having a center axis oriented along an axial direction of the impeller at a front of the impeller. The intake pipe has a constant cross-sectional shape from an upstream end of the first bend portion to a downstream end of the second bend portion.

The above fluid machine includes the intake pipe including two bend portions including the first bend portion disposed on the first plane and the second bend portion disposed on the second plane, which is different from the first plane, and at the downstream side of the first bend portion. The intake pipe has a constant cross section from the upstream end of the first bend portion to the downstream end of the second bend portion. According to the present embodiment, twin swirls are generated in the fluid when the fluid flows through the first bend portion, and the twin swirls in the fluid turn into a swirl flow when the fluid flows through the second bend portion. Thus, it is possible to generate a unidirectional swirl flow in the fluid flowing through the intake pipe. As described above, it is possible to generate a swirl flow in the fluid flowing through the intake pipe with a simplified shape of the intake pipe having a constant cross section, which makes it possible to expand the flow-rate operation range of the fluid machine.

In some embodiments, a bending angle of the first bend portion is in a range of not less than 30° and not more than 150°, and a bending angle of the second bend portion is in a range of not less than 45° and not more than 100°. Further, in the above embodiment, preferably, the bending angle of the first bend portion is in a range of not less than 45° and not more than 90°, and the bending angle of the second bend portion is in a range of not less than 45° and not more than 90°.

According to the above embodiment, it is possible to generate a swirl flow effectively in the fluid flowing through the intake pipe.

In some embodiments, an intersection angle between the first plane and the second plane is in a range of not less than 45° and not more than 135°.

According to the above embodiment, it is possible to generate a unidirectional swirl flow effectively in the fluid flowing through the intake pipe.

In some embodiments, a distance between: an intersection between the center axes of the upstream section and the downstream section of the second bend portion; and a front end of vanes of the impeller is not more than five times a pipe diameter of the intake pipe.

According to the above embodiment, the swirl flow generated in the fluid at the second bend portion is supplied to the impeller in the housing without being damped greatly.

In some embodiments, a distance between: an intersection between the center axes of the upstream section and the downstream section of the first bend portion; and the intersection between the center axes of the upstream section and the downstream section of the second bend portion is not more than three times the pipe diameter of the intake pipe.

According to the above embodiment, the twin swirls generated in the fluid at the first bend portion reach the second bend portion without disappearing, so that a swirl flow is generated in the fluid flowing through the second bend portion.

In one embodiment, in a front view of the impeller, a right or left rotational direction of the impeller is the same direction as a right or left bending direction of the first bend portion from an upstream side to a downstream side.

According to the above embodiment, a swirl flow in a forward direction that swirls in the same direction as the rotational direction of the impeller is generated in the fluid flowing through the downstream section of the second bend portion. In this way, the detachment phenomenon of the fluid is restricted by the reduced attack angle of the impeller, which is effective in widening the flow-rate operation range especially in a range with a small flow rate.

In another embodiment, in a front view of the impeller, a right or left rotational direction of the impeller is opposite to a right or left bending direction of the first bend portion from an upstream side to a downstream side.

According to the above embodiment, a reverse swirl flow swirling in a direction opposite to the rotational direction of the impeller is generated in the fluid flowing through the downstream section of the second bend portion. In this way, the vane load is increased by the increased attack angle of the impeller, which makes it possible to improve the pressure ratio, and thus it is advantageous especially in a region with a large flow rate.

The fluid machine of the above embodiment with the above configuration can be suitably used in particular as a compressor of a turbocharger for an automobile, which is subject to a strong need for size reduction of a device and cost cutting.

Further, at least one embodiment of the present invention is a hydraulic machine system, including: a first hydraulic machine and a second hydraulic machine each of which is the hydraulic machine according to any one of claims 1 to 8; and a collecting pipe for collecting a compressed fluid supplied from the first hydraulic machine and the second hydraulic machine and causing the compressed fluid to flow downstream. A relationship between a swirling direction of the fluid supplied to the housing and a swirling direction of the impeller is a same-direction relationship or an opposite-direction relationship in both of the first fluid machine and the second fluid machine, in a front view of each of the impellers.

With the above fluid machine system in which two fluid machines are arranged in parallel, a relationship between the swirl direction of the fluid supplied to the compressor housing and the swirl direction of the impeller can be configured to be common to the two fluid machines, which makes it possible to average the compressing performance between the two fluid machines.

In some embodiments, the second fluid machine is disposed at a position rotated by 180° from a position of the first fluid machine with respect to an optional symmetrical axis orthogonal to an axial direction of the rotation shaft of the first fluid machine. The impellers of the first fluid machine and the second fluid machine have the same rotational direction in a front view of each of the impellers.

According to the above embodiment, the impellers of the first centrifugal compressor and the second centrifugal compressor may be of the same type, which makes it possible to further average the compressing performance between the two fluid machines.

A hydraulic machine system according to at least one embodiment of the present invention includes: a first fluid machine; and a second fluid machine which further compresses a compressed fluid supplied from the first fluid machine. At least the second fluid machine comprises the fluid machine according to any one of claims 1 to 8.

According to the above fluid-machine system, two fluid machines are disposed in series and the shape of the intake pipe of the second fluid machine is modified, which makes it possible to improve the performance of the fluid machine system as a whole.

Advantageous Effects

According to at least one embodiment of the present invention, the above fluid machine includes the intake pipe including two bend portions including the first bend portion disposed on the first plane and the second bend portion disposed on the second plane, which is different from the first plane, and at the downstream side of the first bend portion. The intake pipe has a constant cross section from the upstream end of the first bend portion to the downstream end of the second bend portion. Thus, it is possible to provide the fluid machine whereby it is possible to improve the performance, for example, to expand the flow-rate operation range, with the simplified shape of the intake pipe.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Further, while a fluid machine of the present invention is applied to a centrifugal compressor of a turbocharger for an automobile in the following description, the usage of the present invention is not limited to this.

Figure 1:
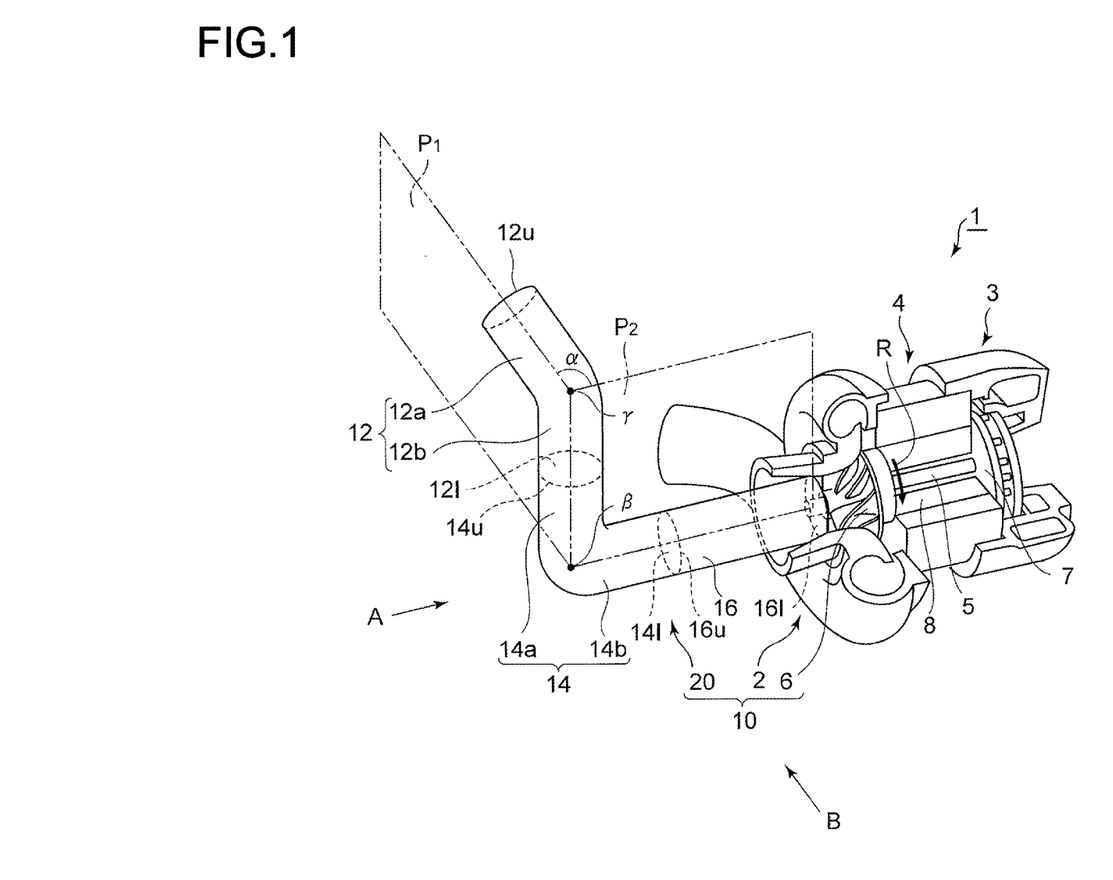
FIG. 1 is a schematic diagram of a turbocharger including a centrifugal compressor according to one embodiment of the present invention.
Figure 2:
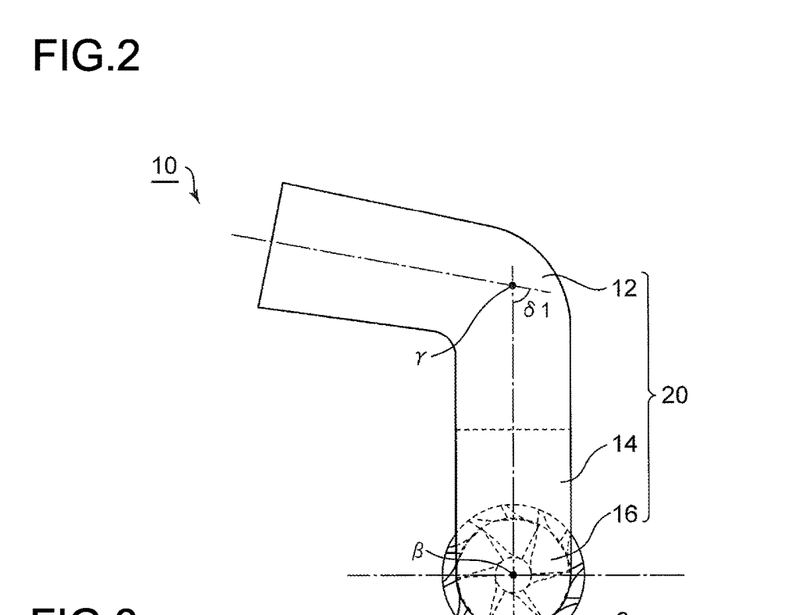
FIG. 2 is a view as seen from direction A of the centrifugal compressor of FIG. 1.
Figure 3:
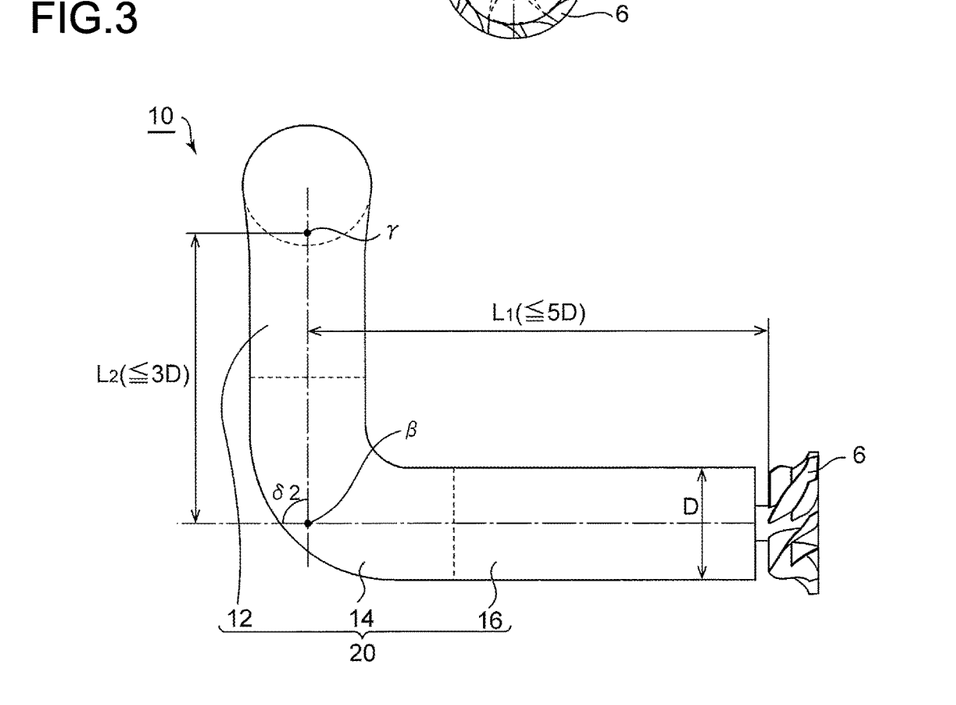
FIG. 3 is a view as seen from direction B of the centrifugal compressor of FIG. 1.

FIG. 1 is a schematic diagram of a turbocharger 1 including a centrifugal compressor 10 according to one embodiment of the present invention. FIG. 2 is a diagram of the centrifugal compressor 10 of FIG. 1 as seen from direction A, i.e., from the front along the axial direction of a compressor wheel 6 which will be described below. FIG. 3 is a diagram of the centrifugal compressor 10 in FIG. 1 as seen from direction B, i.e., from a direction perpendicular to the second plane $P_2$, which will be described below.

As illustrated in FIG. 1, the turbocharger 1 includes a compressor housing 2 (housing) that houses the compressor wheel 6 (impeller) rotatably, a turbine housing 3 that houses the turbine wheel 7 rotatably, and a bearing housing 4 that houses a bearing 8 supporting a rotation shaft 5 rotatably. The bearing housing 4 is disposed between the compressor housing 2 and the turbine housing 3, and fixed to the both of the housings.

The compressor wheel 6 and the turbine wheel 7 are disposed on the opposite ends of the rotation shaft 5. The turbine wheel 7 is rotated by exhaust gas discharged from an engine (not illustrated), and the compressor wheel 6 is driven coaxially with the rotation of the turbine wheel 7. Further, an intake pipe 20 for supplying air to the compressor housing 2 is connected to the front side of the compressor housing 2.

The centrifugal compressor 10 according to one embodiment of the present invention includes the compressor housing 2, the compressor wheel 6, and the intake pipe 20, as illustrated in FIG. 1.

As illustrated in FIGS. 1 to 3, the intake pipe 20 includes the first bend portion 12, the second bend portion 14, and the straight pipe portion 16.

The first bend portion is disposed on the first plane $P_1$, which is a virtual plane. Further, the second bend portion 14 is disposed on the second plane $P_2$, which is a virtual plane different from the first plane $P_1$. The first plane $P_1$ and the second plane $P_2$ intersect with each other at an intersection angle $\alpha$.

Further, the center axis of an upstream section 14a of the second bend portion 14 is oriented along the center axis of a downstream section 12b of the first bend portion 12, and the center axis of a downstream section 14b of the second bend portion 14 is oriented along the axial direction of the compressor wheel 6 at the front of the compressor wheel 6. Further, an upstream end 16u of the straight pipe portion 16 is connected to a downstream end 141 of the second bend portion 14, and a downstream end 161 of the straight pipe portion 16 is connected to the compressor housing 2.

The cross section of the intake pipe 20 is formed in a constant shape from an upstream end 12u of the first bend portion 12 to a downstream end 161 of the straight pipe portion 16.

Figure 4A:
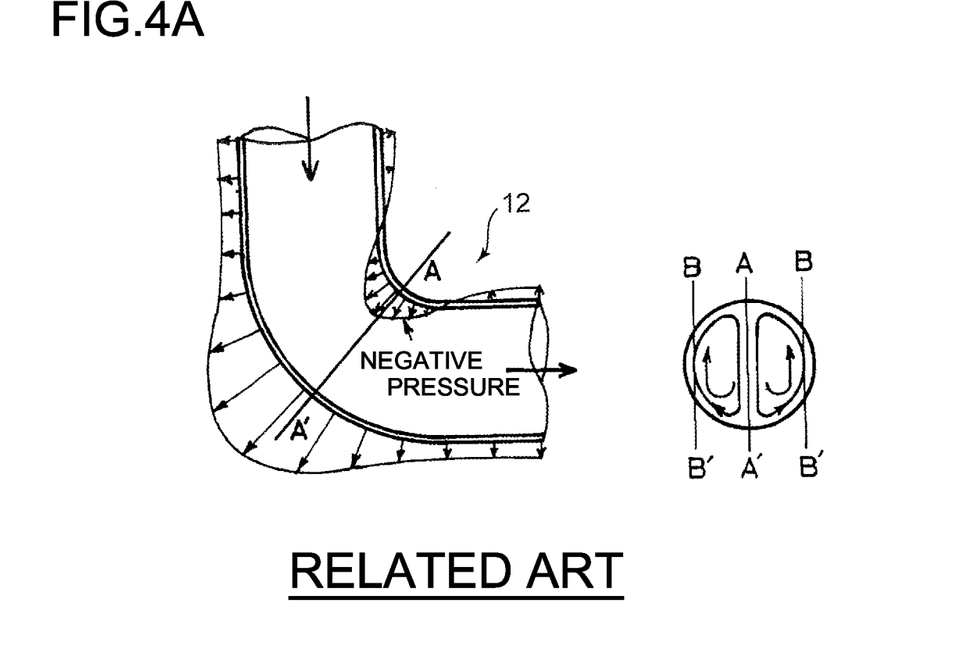
FIGS. 4A and 4B are diagrams for describing a secondary flow in a single curve (from "A study of flow and loss of a curved pipe with a plurality of curves" written by Yukimaru Shimizu, p. 17).
Figure 4B:
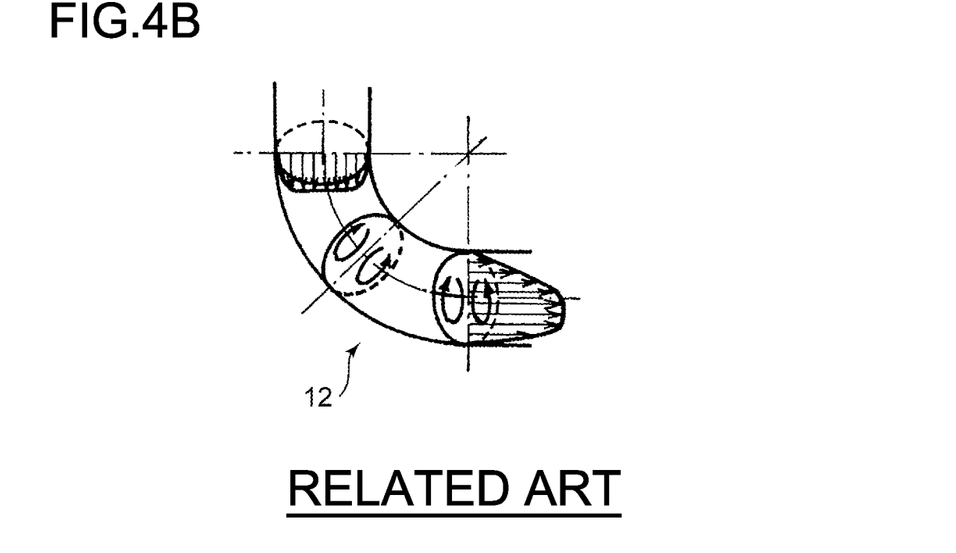

According to the above embodiment, as illustrated in FIG. 4A, when air flows through the first bend portion 12, a negative pressure is generated inside the bend portion due to a centrifugal force acting on the air. Then, as illustrated in FIG. 4B, two swirl flows (twin swirls) are generated in the air. The twin swirls swirl in directions opposite to each other and outwardly from the center of the cross section.

Figure 5A:
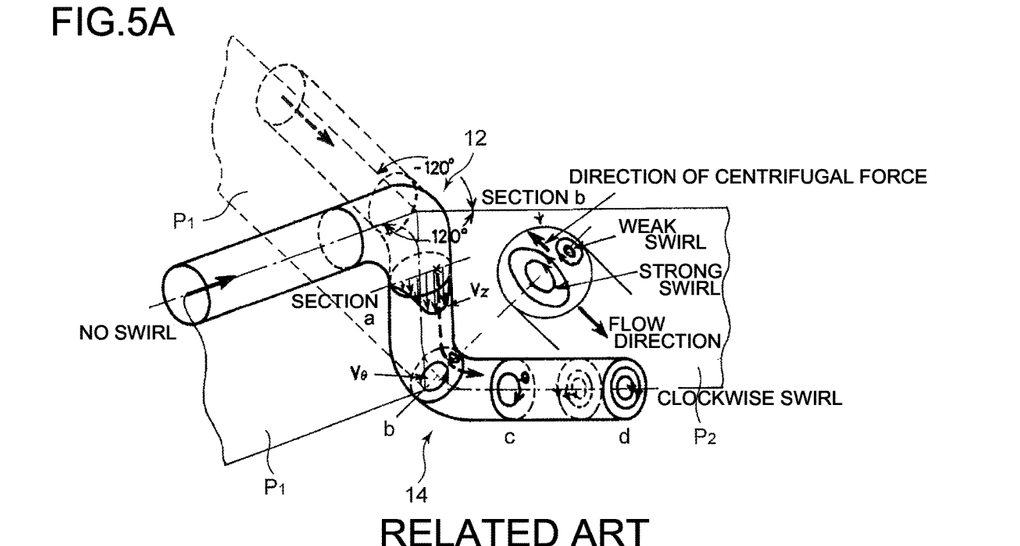
FIGS. 5A and 5B are diagrams for describing a condition in which a swirl flow in a single direction is generated in a case where the pipe is bended in a spatial state (from "A study of flow and loss of a curved pipe with a plurality of curves" written by Yukimaru Shimizu, p. 19).
Figure 5B:
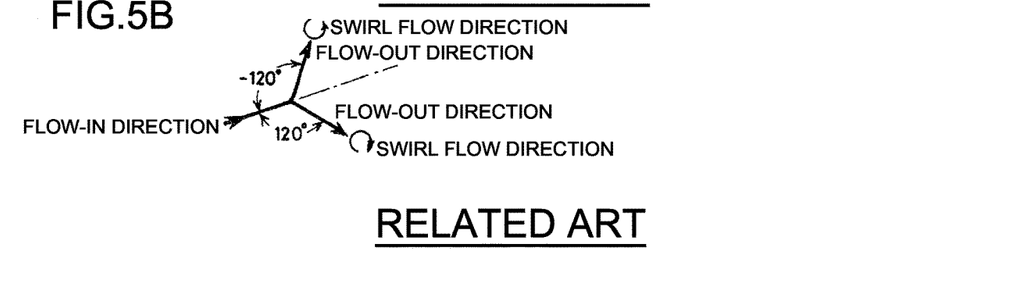

Then, as illustrated in FIGS. 5A and 5B, when the air flows through the second bend portion 14, one of the twin swirls is weakened due to the centrifugal force being applied to the air, and thereby a single swirl flow is generated.

The swirling direction of the swirl flow depends on the bending direction from the upstream side to the downstream side of the first bend portion 12 when the compressor wheel 6 is seen from the front.

Figure 6A:
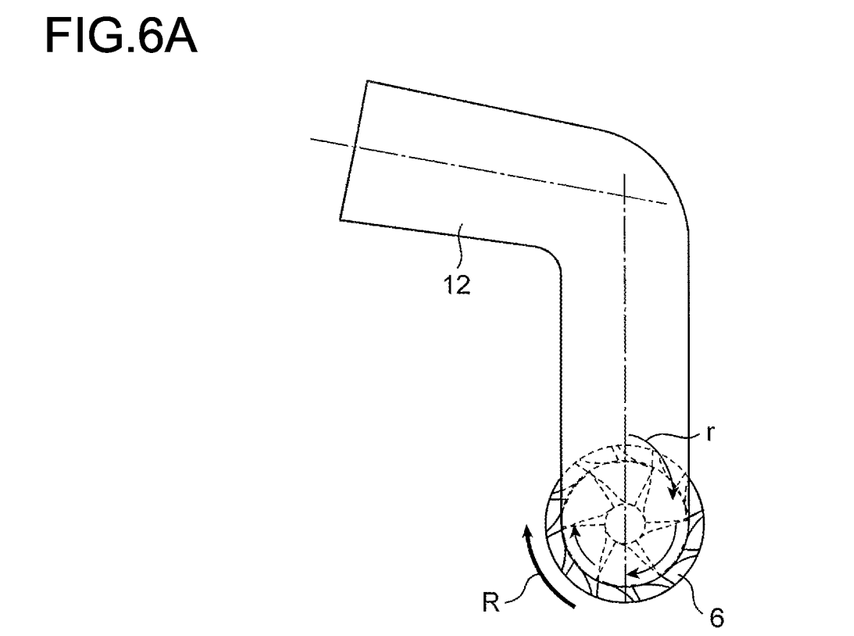
FIGS. 6A and 6B are each a view of a centrifugal compressor according to one embodiment, as seen from the front of the compressor wheel.
Figure 6B:
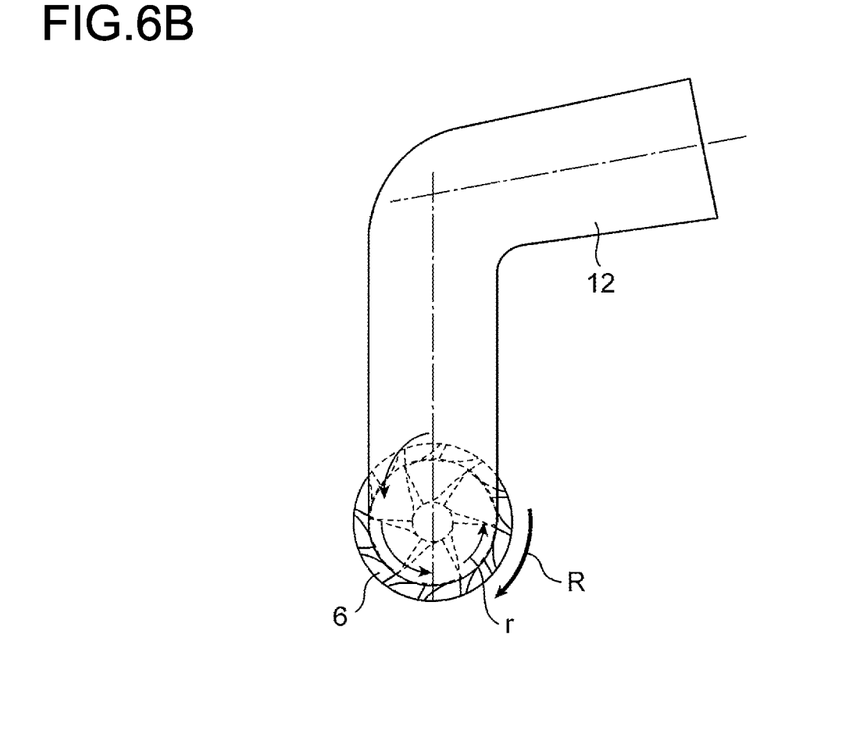

Specifically, as illustrated in FIGS. 6A and 6B, in a front view of the compressor wheel 6, the swirl flow is generated along the bending direction from the upstream side toward the downstream side of the first bend portion 12. For instance, in the embodiment illustrated in FIG. 6A where the first bend portion bends to the left from the upstream side toward the downstream side, a swirl flow "r" swirling to the left (anti-clockwise) is generated in the front view of the compressor wheel 6. On the other hand, in the embodiment illustrated in FIG. 6B where the first bend portion 12 bends to the right from the upstream side toward the downstream side, a swirl flow "r" swirling to the right (clockwise) is generated in the front view of the compressor wheel 6.

According to the at least one embodiment of the present invention, it is possible to generate a swirl flow swirling in a single direction in the fluid flowing through the intake pipe 20 with a simple shape of the intake pipe having a constant cross section, which makes it possible to expand the flow-rate operation range of the fluid machine 1.

In the embodiment illustrated in FIG. 1, the straight pipe portion 16 is disposed between the second bend portion 14 and the compressor housing 2. The downstream end 141 of the second bend portion 14 may be connected to the compressor housing 2 directly.

Further, while the downstream end 121 of the first bend portion 12 and the upstream end 14u of the second bend portion 14 are connected to each other in the embodiment illustrated in FIG. 1, a strait pipe portion may be disposed therebetween.

In some embodiments, the bending angle ($\delta 1$) of the first bend portion 12 illustrated in FIG. 2 is set to be within a range of not less than 30° and not more than 150°, while the bending angle ($\delta 2$) of the second bend portion 14 illustrated in FIG. 3 is set to be within a range of not less than 45° and not more than 100°.

Further, in the above embodiment, preferably, the bending angle ($\delta 1$) of the first bend portion 12 is set to be within a range of not less than 45° and not more than 90°, while the bending angle ($\delta 2$) of the second bend portion 14 is set to be within a range of not less than 45° and not more than 90°.

According to the above embodiment, it is possible to generate a swirl flow effectively in the fluid flowing through the intake pipe 20.

Further, in some embodiments, the intersection angle $\alpha$ between the first plane $P_1$ and the second plane $P_2$ illustrated in FIG. 1 is set to be within a range of not less than 45° and not more than 135°

According to the above embodiment, it is possible to generate a unidirectional swirl flow effectively in the fluid flowing through the intake pipe 20.

Further, in some embodiments, as illustrated in FIG. 3, the distance $L_1$ between the front end of the vanes of the compressor wheel 6 and the intersection β between the center axes of the upstream section 14a and the downstream section 14b of the second bend portion 14 is set to be not more than five times larger than the pipe diameter D of the intake pipe 20.

According to the above embodiment, the swirl flow generated in the air in the second bend portion 14 is supplied to the compressor wheel 6 without being damped considerably.

Also at this time, if the distance L is three times the pipe diameter D or more, it is possible to secure an adequate space for connection between the second bend portion 14 and the compressor housing 2.

Further in some embodiments, as illustrated in FIG. 3, the distance $L_2$ between the intersection γ between the center axes of the upstream section 12a and the downstream section 12b of the first bend portion 12 and the intersection β of the center axes of the upstream section 14a and the downstream section 14b of the second bend portion is set to be not more than three times larger than the pipe diameter D of the intake pipe 20. Here, the distance $L_2$ is preferably at least 1D, in view of fabrication of the bend portion.

According to the above embodiment, the twin swirls generated in the fluid in the first bend portion 12 reach the second bend portion 14 without disappearing, so that a swirl flow is generated in the air flowing through the second bend portion 14.

In one embodiment, when the compressor wheel 6 is seen from the front, the right or left rotational direction of the compressor wheel 6 is the same as the right or left bending direction of the first bend portion 12 from the upstream side toward the downstream side. For instance, in the embodiment illustrated in FIG. 6A, when the compressor wheel 6 is seen from the front, the first bend portion 12 bends to the right from the upstream side toward the downstream side, while the compressor wheel 6 rotates to the right (clockwise).

According to the above embodiment, a swirl flow "r" swirling in a forward direction that is the same direction as the rotational direction R of the compressor wheel 6 is generated in the air flowing through the downstream section of the second bend portion 14. In this way, the detachment phenomenon of the fluid is restricted in accordance with the reduction in the attack angle of the impeller, which is effective in expanding the flow-rate operation range especially in a range with a small flow rate.

In another embodiment, in the front view of the compressor wheel 6, the right or left rotational direction of the compressor wheel 6 is opposite to the right or left bending direction of the first bend portion 12 bending from the upstream side toward the downstream side. For instance, in the embodiment illustrated in FIG. 6B, in the front view of the compressor wheel 6, the first bend portion 12 bends to the left from the upstream side toward the downstream side, while the compressor wheel 6 rotates to the right (clockwise).

According to the above embodiment, a swirl flow "r" swirling in a reverse direction that is the opposite direction to the rotational direction R of the compressor wheel 6 is generated in the air flowing through the downstream section of the second bend portion 14. In this way, the vane load is increased by the increase in the attack angle of the impeller, which makes it possible to improve the pressure ratio, and thus it is advantageous especially in a region with a large flow rate.

Figure 7:
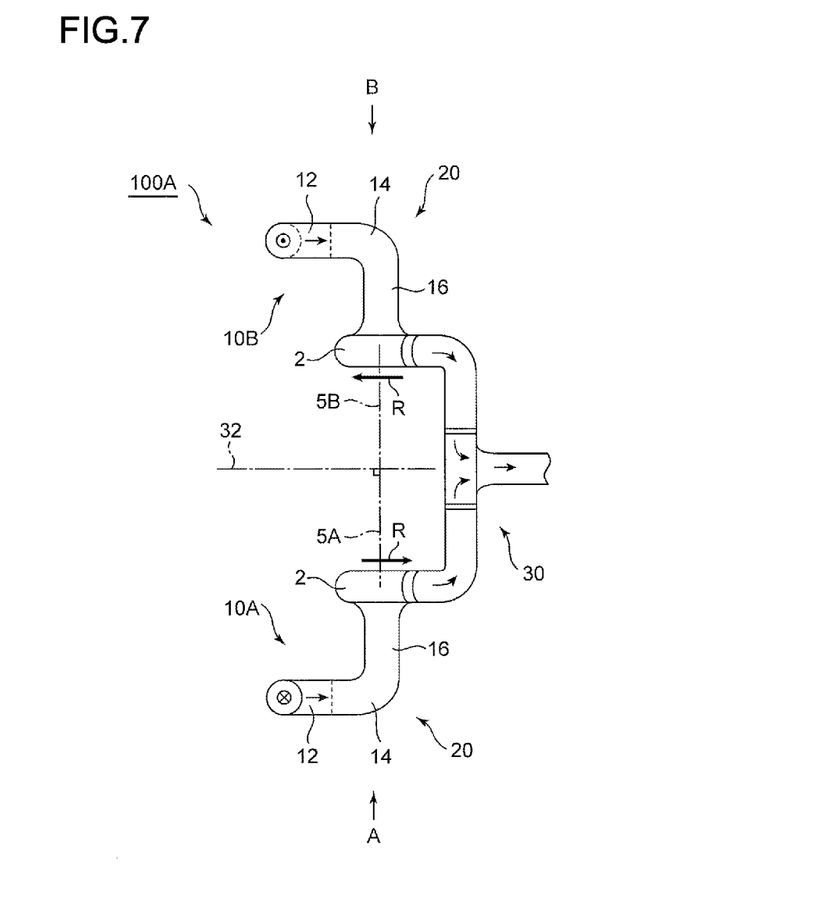
FIG. 7 is a diagram of a fluid machine system according to one embodiment of the present invention.
Figure 8A:
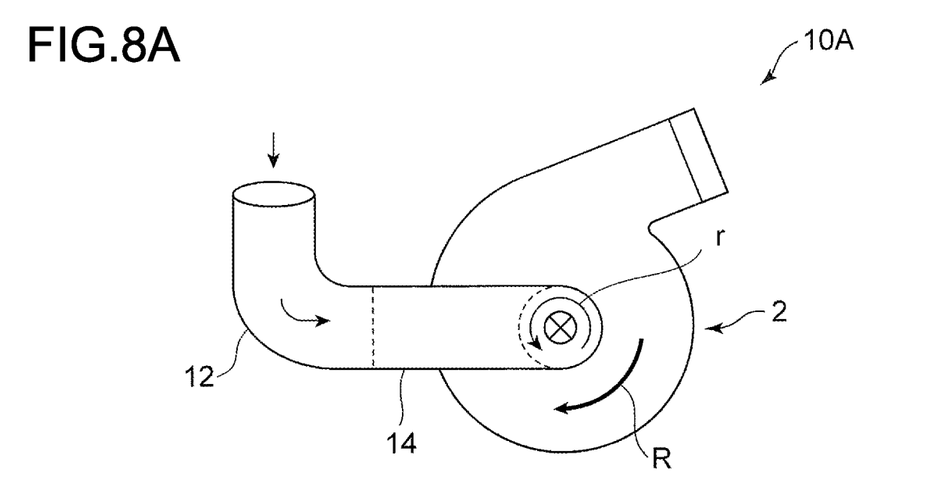
FIG. 8A is a diagram of the first centrifugal compressor in FIG. 7 as seen from direction A.

FIG. 7 is a diagram of a fluid machine system 100A according to one embodiment of the present invention. FIG. 8A is a diagram of the first centrifugal compressor 10A in FIG. 7 as seen from direction A, and FIG. 8B is a diagram of the second centrifugal compressor 10B in FIG. 7 as seen from direction B.

As illustrated in FIG. 7, the fluid machine system 100A of the present embodiment includes two centrifugal compressors: the first centrifugal compressor (the first fluid machine) 10A, which is the centrifugal compressor of the present invention described above, and the second centrifugal compressor (the second fluid machine) 10B.

Figure 8B:
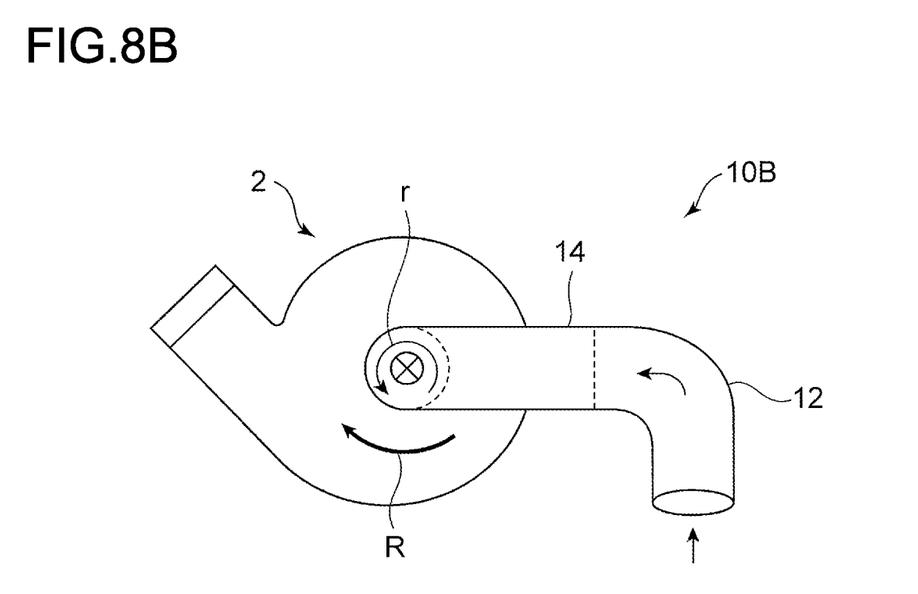
FIG. 8B is a diagram of the second centrifugal compressor in FIG. 7 as seen from direction B.

As illustrated in FIGS. 7, 8A and 8B, the second centrifugal compressor 10B is disposed at a position that is rotated by 180° from the position of the first centrifugal compressor 10A with respect to an optional symmetrical axis 32 orthogonal to the rotation shaft 5A of the first centrifugal compressor 10A.

Further, the fluid machine system 100A illustrated in FIG. 7 includes a collecting pipe 30 for collecting compressed fluid supplied from the first centrifugal compressor 10A and the second centrifugal compressor 10B and causing the compressed fluid to flow downstream. As a result, in the fluid machine system 100A, the first centrifugal compressor 10A and the second centrifugal compressor 10B are arranged in parallel.

Further, a turbine (not illustrated) is connected to each of the rotation shafts 5A, 5B of the first centrifugal compressor 10A and the second centrifugal compressor 10B. The two turbines are of the same type rotating in the same direction (e.g. clockwise) as in the front view of each turbine. When exhaust gas is introduced into the turbines, the compressor wheels 6 of the first centrifugal compressor 10A and the second centrifugal compressor 10B rotate in the same direction in the front view, as each indicated by arrow R. Specifically, the compressor wheels 6 of the first centrifugal compressor 10A and the second centrifugal compressor 10B may be of the same type. For instance, in the embodiment illustrated in FIGS. 8A and 8B, both of the compressor wheels 6 of the first centrifugal compressor 10A and the second centrifugal compressor 10B rotate to the right (clockwise) in the front view of each compressor wheel 6.

Further, since the second centrifugal compressor 10B is disposed at a position rotated by 180° from the position of the first centrifugal compressor 10A with respect to an optional symmetrical axis 32 orthogonal to the rotation shaft 5A of the first centrifugal compressor 10A as described above, the swirl flows of the first centrifugal compressor 10A and the second centrifugal compressor 10B swirl in the same direction. For instance, in the embodiment illustrated in FIGS. 8A and 8B, a swirl flow swirling to the left (anti-clockwise) in the front view of the corresponding compressor wheel 6 is generated in both of the first centrifugal compressor 10A and the second centrifugal compressor 10B.

With the above fluid machine system 100A in which two centrifugal compressors (fluid machines), namely the first centrifugal compressor 10A and the second centrifugal compressor 10B, are arranged in parallel, a relationship between the swirl direction "r" of the fluid supplied to the compressor housing 2 and the rotational direction R of the compressor wheel 6 can be configured to be common to the two fluid machines, which makes it possible to average the compressing performance between the two fluid machines.

Further, with the above fluid machine system 100A, the compressor wheels 6 of the first centrifugal compressor 10A and the second centrifugal compressor 10B may be of the same type, which makes it possible to further average the compressing performance between the two fluid machines.

Figure 9A:
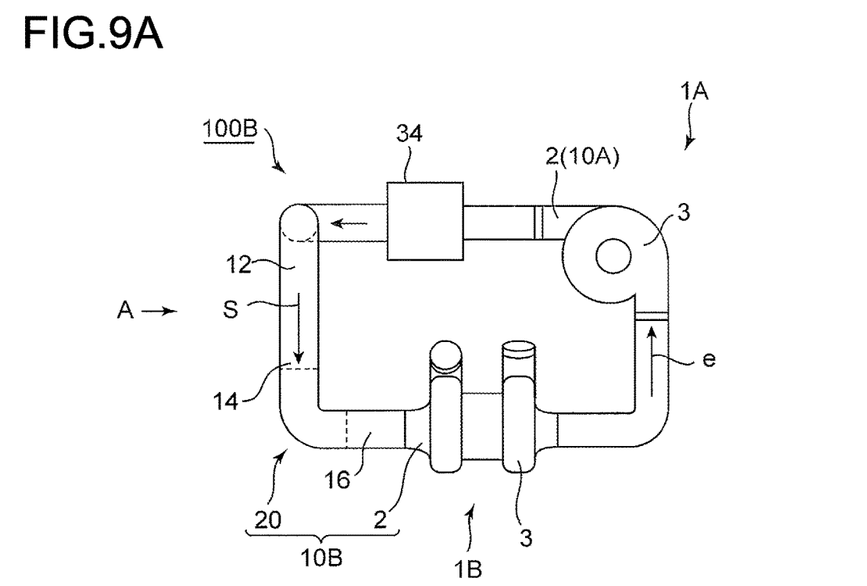
FIGS. 9A and 9B are diagrams of a fluid machine system according to one embodiment of the present invention.
Figure 9B:
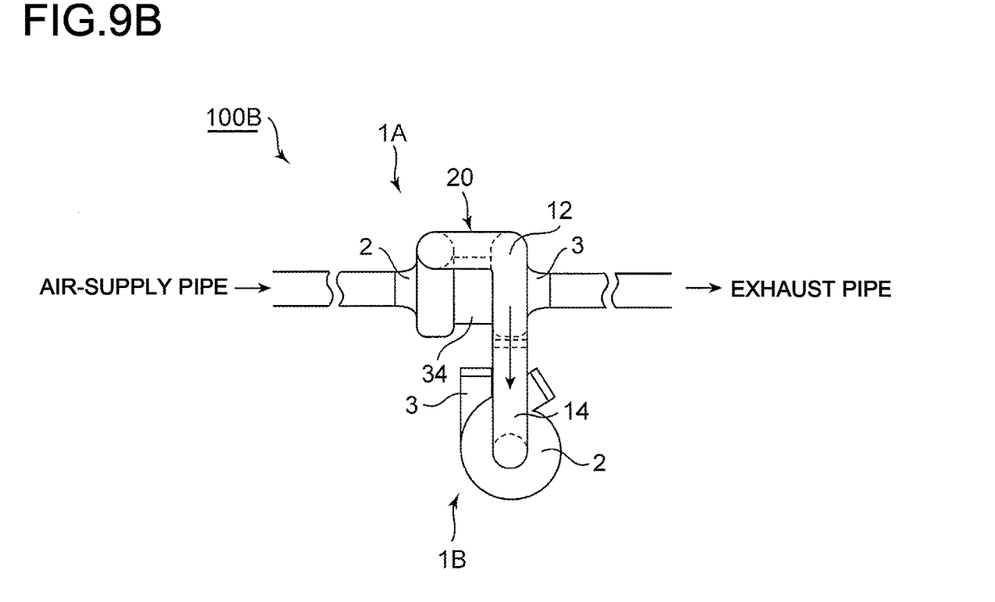

FIGS. 9A and 9B are diagrams of a fluid machine system 100B according to one embodiment of the present invention. FIG. 9A is an overview, and FIG. 9B is a view of FIG. 9A as seen from direction A.

As illustrated in FIGS. 9A and 9B, the fluid hydraulic system 100B of the present embodiment includes the first turbocharger 1A including the first centrifugal compressor 10A, and the second turbocharger 1B including the second centrifugal compressor 10B. Here, in the drawings, arrow e indicates the direction of the flow of the exhaust gas, and arrow s indicates the direction of the flow of the air-supply gas.

The centrifugal compressor 10B of the second turbocharger 1B is disposed at the downstream side of the centrifugal compressor 10A of the first turbocharger 1A, so that the compressed fluid compressed by the first centrifugal compressor 10A is supplied thereto. Specifically, the fluid machine system 100B of the present embodiment is a two-stage turbocharger including a low-pressure stage turbocharger and a high-pressure stage turbocharger, in which the compressed air compressed by the centrifugal compressor 10A of the first turbocharger 1A is further compressed by the centrifugal compressor 10B of the second turbocharger 1B. Here, the reference numeral 34 in the drawings indicates an intercooler for cooling the air passing by.

In the fluid machine system 100B of the present embodiment, the centrifugal compressor 10B of the second turbocharger 1B corresponding to the high-pressure stage turbocharger comprises at least the centrifugal compressor of the present invention described above. Further, the centrifugal compressor 10A of the first turbocharger 1A may also comprise the centrifugal compressor of the present invention described above.

With the above fluid machine system 100B where two centrifugal compressors (fluid machines), namely the first centrifugal compressor 10A and the second centrifugal compressor 10B, are arranged in series, the shape of the intake pipe 20 of the second centrifugal compressor 10B is modified as described above, which makes it possible to generate a swirl flow swirling in a predetermined direction in the air supplied to the compressor housing 2 of the second centrifugal compressor 10B. Thus, it is possible to improve the performance of the fluid machine system as a whole.

As described above in detail, according to at least one embodiment of the present invention, the above fluid machine includes the intake pipe 20 including two bend portions including the first bend portion 12 disposed on the first plane $P_1$ and the second bend portion 14 disposed on the second plane $P_2$, which is different from the first plane $P_1$, and at the downstream side of the first bend portion 12. The intake pipe 20 has a constant cross section from the upstream end 12u of the first bend portion 12 to the downstream end 14l of the second bend portion 14. Thus, it is possible to provide a fluid machine such as the centrifugal compressor 10 whereby it is possible to improve the performance, for example to expand the flow-rate operation range with the simplified shape of the intake pipe.

Embodiments of the present invention were described in detail above, but the present invention is not limited thereto, and various amendments and modifications may be implemented within a scope that does not depart from the present invention.

INDUSTRIAL APPLICABILITY

A fluid machine according to at least one embodiment of the present invention can be suitably used as a centrifugal fluid machine such as a centrifugal compressor and a centrifugal blower. For example, it can be suitably used as a centrifugal compressor such as a turbocharger and a turbo freezer mounted to a vehicle or a ship.

The invention claimed is:

1. A fluid machine, comprising:
an impeller mounted to a rotation shaft;
a housing which houses the impeller rotatably; and
an intake pipe for supplying a fluid to the housing,
wherein the intake pipe includes at least:
a first bend portion disposed on a first plane; and
a second bend portion disposed at a downstream side of the first bend portion and on a second plane which is different from the first plane, the second bend portion including an upstream section having a center axis oriented along a center axis of a downstream section of the first bend portion and a downstream section having a center axis oriented along an axial direction of the impeller at a front of the impeller,
wherein the intake pipe has a constant cross-sectional shape from an upstream end of the first bend portion to a downstream end of the second bend portion, and
wherein a distance between an intersection between the center axes of the upstream section and the downstream section of the first bend portion, and the intersection between the center axes of the upstream section and the downstream section of the second bend portion is not more than three times the pipe diameter of the intake pipe.

2. The fluid machine according to claim 1,
wherein a bending angle of the first bend portion is in a range of not less than 30° and not more than 150°, and a bending angle of the second bend portion is in a range of not less than 45° and not more than 100°.

3. The hydraulic machine according to claim 2,
wherein the bending angle of the first bend portion is in a range of not less than 45° and not more than 90°, and the bending angle of the second bend portion is in a range of not less than 45° and not more than 90°.

4. The hydraulic machine according to claim 1,
wherein an intersection angle between the first plane and the second plane is in a range of not less than 45° and not more than 135°.

5. The hydraulic machine according to claim 1,
wherein a distance between: an intersection between the center axes of the upstream section and the downstream section of the second bend portion; and a front end of vanes of the impeller is not more than five times a pipe diameter of the intake pipe.

6. The hydraulic machine according to claim 1,
wherein, in a front view of the impeller, a right or left rotational direction of the impeller is the same direction as a right or left bending direction of the first bend portion from an upstream side to a downstream side.

7. The hydraulic machine according to claim 1,
wherein, in a front view of the impeller, a right or left rotational direction of the impeller is opposite to a right or left bending direction of the first bend portion from an upstream side to a downstream side.

8. The fluid machine according to claim 1,
wherein the fluid machine is a compressor of a turbocharger for an automobile.

9. A hydraulic machine system, comprising:
a first hydraulic machine and a second hydraulic machine each of which is the hydraulic machine according to claim 1; and
a collecting pipe for collecting a compressed fluid supplied from the first hydraulic machine and the second hydraulic machine and causing the compressed fluid to flow downstream, wherein, a relationship between a swirling direction of the fluid supplied to the housing and a swirling direction of the impeller is a same-direction relationship or an opposite-direction relationship in both of the first fluid machine and the second fluid machine, in a front view of each of the impellers.

10. The hydraulic machine system according to claim 9, wherein the second fluid machine is disposed at a position rotated by 180° from a position of the first fluid machine with respect to an optional symmetrical axis orthogonal to an axial direction of the rotation shaft of the first fluid machine, and wherein the impellers of the first fluid machine and the second fluid machine have the same rotational direction in a front view of each of the impellers.

11. A hydraulic machine system comprising:

a first fluid machine; and a second fluid machine which further compresses a compressed fluid supplied from the first fluid machine, wherein at least the second fluid machine comprises the fluid machine according to claim 1.

12. The fluid machine according to claim 1, wherein the intake pipe includes a straight pipe portion having an upstream end connected to a downstream end of the second bend portion and a downstream end connected to the housing, and wherein a distance between an intersection between the center axes of the upstream section and the downstream section of the second bend portion, and a front end of vanes of the impeller is not more than five times a pipe diameter of the intake pipe.

* * * * *